US011134216B2

(12) United States Patent
McArdle

(10) Patent No.: US 11,134,216 B2
(45) Date of Patent: *Sep. 28, 2021

(54) VIDEOCONFERENCING CALIBRATION SYSTEMS, CONTROLLERS AND METHODS FOR CALIBRATING A VIDEOCONFERENCING SYSTEM

(71) Applicant: Zeller Digital Innovations, Inc., Normal, IL (US)

(72) Inventor: Justin McArdle, Rochester, IL (US)

(73) Assignee: Zeller Digital Innovations, Inc., Normal, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,075

(22) Filed: Jun. 22, 2020

(65) Prior Publication Data

US 2020/0322574 A1  Oct. 8, 2020

Related U.S. Application Data

(63) Continuation of application No. 16/673,150, filed on Nov. 4, 2019, now Pat. No. 10,715,763, which is a
(Continued)

(51) Int. Cl.
*H04N 7/15* (2006.01)
*G06F 3/16* (2006.01)
(Continued)

(52) U.S. Cl.
CPC .............. *H04N 7/15* (2013.01); *G06F 3/162* (2013.01); *G06F 3/165* (2013.01); *H04N 7/147* (2013.01); *H04N 17/004* (2013.01)

(58) Field of Classification Search
USPC ....................................................... 348/14.08
See application file for complete search history.

(56) References Cited

U.S. PATENT DOCUMENTS

| 6,243,129 B1 * | 6/2001 | Deierling | H04N 5/14 |
| | | | 348/E5.062 |
| 7,031,391 B1 * | 4/2006 | Riffee | H04N 7/52 |
| | | | 375/240.27 |

(Continued)

FOREIGN PATENT DOCUMENTS

| JP | 2012160838 A | 8/2012 |
| KR | 20100084083 A | 7/2010 |

(Continued)

OTHER PUBLICATIONS

International Search Report from PCT Application No. PCT/US2018/050449 dated Jan. 11, 2019 (4 pages).
(Continued)

*Primary Examiner* — Amal S Zenati
(74) *Attorney, Agent, or Firm* — Harness, Dickey & Pierce, P.L.C.

(57) ABSTRACT

A videoconferencing calibration system includes a first codec, a second codec connected to the first codec via a videoconferencing connection, and a first controller in communication with the first codec. The first controller is configured to control a videoconferencing component to transmit a videoconferencing signal to the second codec though the videoconferencing connection. The system also includes a second controller in communication with the second codec. The second controller is configured to analyze the videoconferencing signal transmitted though the videoconferencing connection to determine a calibration adjustment value according to at least one calibration adjustment rule, and to transmit the determined calibration adjustment value to the first controller. The first controller is configured to adjust a signal level setting of the first codec according to the calibration adjustment value transmitted by the second controller.

21 Claims, 15 Drawing Sheets

Related U.S. Application Data continuation of application No. 16/128,082, filed on Sep. 11, 2018, now Pat. No. 10,477,146.

(60) Provisional application No. 62/556,760, filed on Sep. 11, 2017.

(51) Int. Cl.
*H04N 7/14* (2006.01)
*H04N 17/00* (2006.01)

(56) References Cited

U.S. PATENT DOCUMENTS

| | | | |
|---|---|---|---|
| 9,578,283 | B1 | 2/2017 | Lynch et al. |
| 2004/0022322 | A1 | 2/2004 | Dye |
| 2006/0176832 | A1* | 8/2006 | Miceli ............... H04N 21/2402 370/260 |
| 2008/0266385 | A1 | 10/2008 | Smith et al. |
| 2009/0309977 | A1 | 12/2009 | Gevrekci et al. |
| 2010/0073454 | A1* | 3/2010 | Lovhaugen ............ H04N 7/147 348/14.03 |
| 2012/0075406 | A1 | 3/2012 | Hultkrantz et al. |
| 2016/0373694 | A1* | 12/2016 | McArdle ............... H04M 3/567 |

FOREIGN PATENT DOCUMENTS

| | | |
|---|---|---|
| KR | 20130075459 A | 7/2013 |
| KR | 20140001477 A | 1/2014 |

OTHER PUBLICATIONS

Written Opinion from PCT Application No. PCT/US2018/050449 dated Jan. 11, 2019 (10 pages).

* cited by examiner

Near End Microphone Transmission Calibration

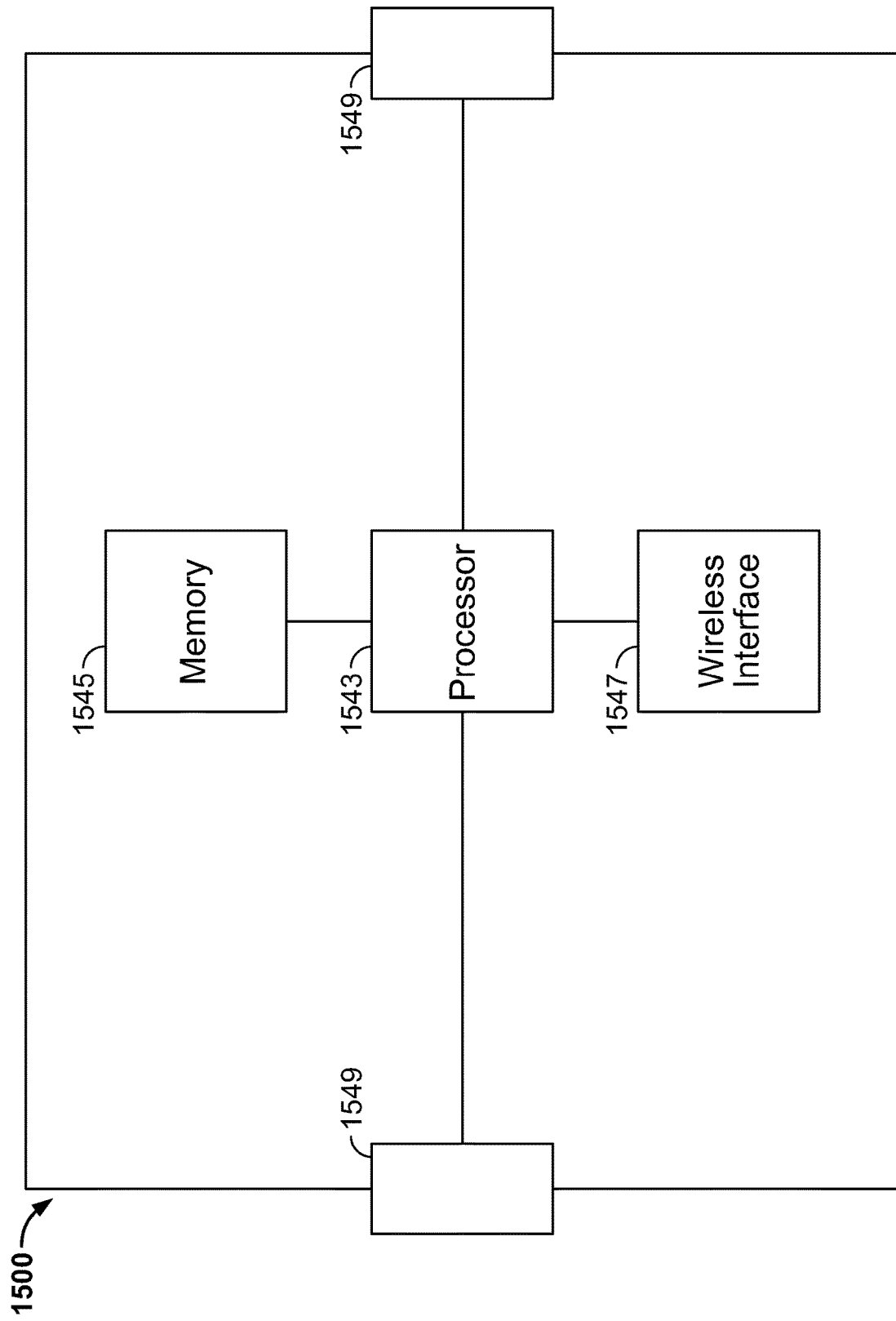

VIDEOCONFERENCING CALIBRATION SYSTEMS, CONTROLLERS AND METHODS FOR CALIBRATING A VIDEOCONFERENCING SYSTEM

CROSS-REFERENCE TO RELATED APPLICATIONS

This application is a continuation of U.S. patent application Ser. No. 16/673,150 filed Nov. 4, 2019, which is a continuation of U.S. patent application Ser. No. 16/128,082 filed Sep. 11, 2018, which claims the benefit and priority of U.S. Provisional Application No. 62/556,760 filed on Sep. 11, 2017. The entire disclosures of each of the above applications are incorporated herein.

FIELD

The present disclosure relates to videoconferencing calibration systems, controllers and methods for calibrating a videoconferencing system.

BACKGROUND

This section provides background information related to the present disclosure which is not necessarily prior art.

Videoconferencing systems typically include a codec for establishing videoconferencing calls with other codec(s) in other videoconferencing systems. Various input and output videoconferencing components may be connected with the codecs, such as speakers, cameras, displays, etc. The videoconferencing components receive audio and video inputs from participants in a videoconferencing call, and supply audio and video outputs to the participants in the videoconferencing call. The videoconferencing components may have different calibration levels for volume, brightness, resolution, etc.

SUMMARY

This section provides a general summary of the disclosure, and is not a comprehensive disclosure of its full scope or all of its features.

According to one aspect of the present disclosure, a videoconferencing calibration system includes a first codec, a second codec connected to the first codec via a videoconferencing connection, and a first controller in communication with the first codec. The first controller is configured to control a videoconferencing component to transmit a videoconferencing signal to the second codec though the videoconferencing connection. The system also includes a second controller in communication with the second codec. The second controller is configured to analyze the videoconferencing signal transmitted though the videoconferencing connection to determine a calibration adjustment value according to at least one calibration adjustment rule, and to transmit the determined calibration adjustment value to the first controller. The first controller is configured to adjust a signal level setting of the first codec according to the calibration adjustment value transmitted by the second controller.

According to another aspect of the present disclosure, a method of calibrating a videoconferencing system is disclosed. The videoconferencing system includes a first controller in communication with a first codec, and a second controller in communication with a second codec. The second codec is connected to the first codec though a videoconferencing connection. The method includes receiving, at the second codec, a videoconferencing signal transmitted by the first codec to the second codec through the videoconferencing connection between the first codec and the second codec, and analyzing, by the second controller, the videoconferencing signal received at the second codec to determine a calibration adjustment value according to at least one calibration adjustment rule. The method also includes transmitting the determined calibration adjustment value to the first controller to allow the first controller to adjust a signal level setting of the first codec according to the determined calibration adjustment value.

According to another aspect of the present disclosure, a controller for calibrating a videoconferencing system is disclosed. The system includes a first codec connected to a second codec through a videoconferencing connection. The controller includes an input in communication with the first codec for obtaining a videoconferencing signal received by the first codec from the second codec through the videoconferencing connection, and an output for transmitting a calibration adjustment value to another controller over a network, the other controller in communication with the second codec. The controller is configured to analyze the obtained videoconferencing signal received by the first codec to determine the calibration adjustment value according to at least one calibration adjustment rule, and to transmit the determined calibration adjustment value to the other controller to allow the other controller to adjust a signal level setting of the second codec using a level adjustment command of the second codec. The level adjustment command corresponds to the determined calibration adjustment value.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 is a block diagram of a controller, according to another example embodiment of the present disclosure.

Corresponding reference numerals indicate corresponding parts throughout the several views of the drawings.

DETAILED DESCRIPTION

Figure 1:
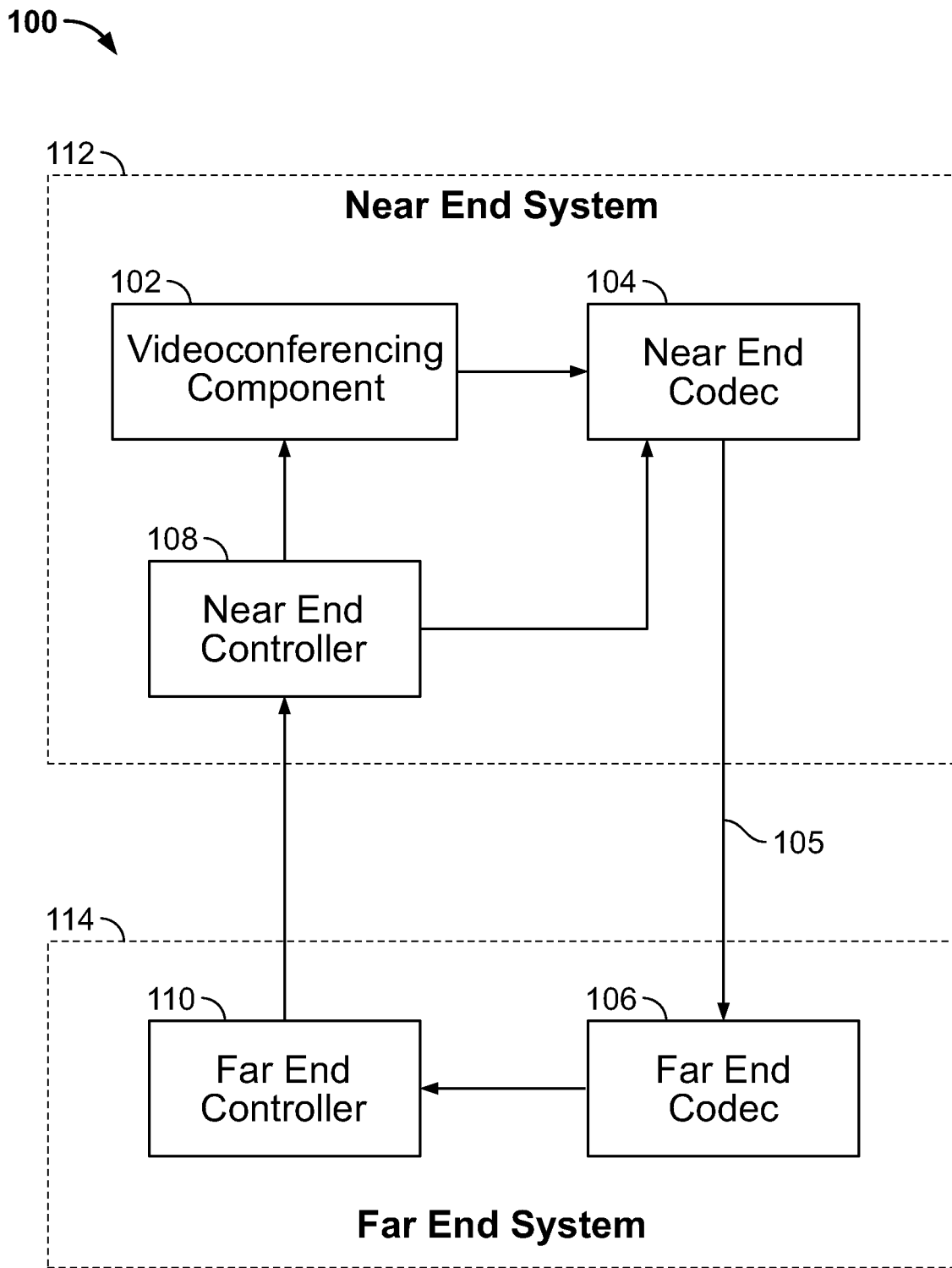
FIG. 1 is a block diagram of a videoconferencing calibration system according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A videoconferencing calibration system according to one example embodiment of the present disclosure is illustrated in FIG. 1, and indicated generally by reference number 100. As shown in FIG. 1, the videoconferencing calibration system 100 includes a near end system 112 and a far end system 114.

The near end system 112 includes a videoconferencing component 102, a near end codec 104 and a near end controller 108. The near end codec 104 is in communication with the videoconferencing component 102. The far end system includes a far end codec 106 and a far end controller 110. The far end codec 106 is connected to the near end codec 104 via a videoconferencing connection 105 (e.g., an analog or digital pathway for communication between two devices, computers, software programs, codecs, etc.).

In the near end system 112, the near end controller 108 is coupled with the videoconferencing component 102 and the near end codec 104. The near end controller 108 is configured to control the videoconferencing component 102 to transmit a videoconferencing signal to the far end codec 106 though the videoconferencing connection 105.

In the far end system 114, the far end controller 110 is coupled with the far end codec 106. The far end controller 110 is configured to analyze the videoconferencing signal transmitted though the videoconferencing connection 105 to determine a calibration adjustment value by comparing at least one signal level value of the videoconferencing signal to a calibration target according to at least one calibration adjustment rule.

The far end controller 110 is configured to transmit the determined calibration adjustment value to the near end controller 108. The near end controller 108 is configured to adjust a signal level setting of the near end codec 104 according to the determined calibration adjustment value. For example, the near end controller 108 may adjust the signal level setting of the near end codec 104 using a level adjustment command of the near end codec 104, where the level adjustment command corresponds to the calibration adjustment value transmitted by the far end controller 110.

The near end system 112 and far end system 114 may be located in the same or separate buildings. For example, the near end codec 104 can be located in a building separate from the building of the far end codec 106 (e.g., the far end system 114 is a remote calibrated system, etc.). In this case, the videoconferencing connection 105 between the near end codec 104 and the far end codec 106 may be implemented via a network connection (e.g., Internet, etc.) between the near end codec 104 and the far end codec 106, etc.

In other embodiments, the near end codec 104 and far end codec 106 may be located in a same building (e.g., a same room, etc.). In this case, 'far end' may simply refer to a test system where the far end codec 106 is used to test the 'near end' codec 104. For example, the far end codec 106 and far end controller 110 could be located on a same equipment rack, cart, etc. as the near end codec 104 and the near end controller 108.

In some embodiments, the near end is a location (e.g., site) of a conferencing system to be commissioned, where a technician, end user, etc. initiates a commissioning process. The far end may be a location of a conferencing system that is called from the near end. Test equipment may reside at the far end and process requests received at the far end. The far end may be on the same network as the near end system, in the 'cloud' outside of a near end system network, etc.

The videoconferencing component 102 may include any suitable videoconferencing component capable of generating a videoconferencing signal, such as a microphone, an audio digital signal processor, an audio line input, a video switcher, a camera, etc.

The videoconferencing signal may correspond to the type(s) of videoconferencing component(s) 102 in the system 100. For example, the videoconferencing signal may include an audio signal when the videoconferencing component 102 is an audio component, a video signal when the videoconferencing component 102 is a video component, an audio and video signal when the videoconferencing component 102 is an audio and video component, etc.

Accordingly, the videoconferencing calibration system 100 may be used to automatically configure, calibrate, etc. the system 100. For example, the near end controller 108 may initially set a default configuration of the near end codec 104. The near end controller 108 can then control one or more videoconferencing component(s) 102 to simulate the near end experience of a conference call. This may include, but is not limited to, generating a calibrated signal level from a signal generator within the near end system, generating a calibrated video signal level from a signal generator within the near end system, etc.

The calibrated level can include a level, resolution, etc. of an audio and/or video signal that is in agreement with a predetermined or target value. The value may be an industry standard, a site specific value, a customer specific value, a value determined by the system administrator, etc.

The near end controller 108 can then establish a connection with the far end controller 110 (e.g., on the far end of the conference call). The near end controller 108 can communicate with the near end codec 104 via API commands, etc. to initiate and connect a videoconferencing call with the far end system 114. The far end system 114 can then accept the call and run through one or more tests to determine the appropriate configuration of the near end system 112.

During this procedure, the near end controller 108 may communicate with the far end controller 110 to adjust settings in the near end codec 104. For example, the near end controller 108 may adjust settings of the near end codec 104 through API commands, etc., to establish appropriate levels and configuration settings of the near end codec 104.

Once the appropriate configuration is determined, the near end controller 108 can save the finalized configuration. This finalized configuration may be sent to the far end controller 110 for archival purposes, etc. If desired, the configuration may be verified by a human user in the room of the near end system 112, and any further changes can be made and saved to the configuration of the near end codec 104. The configuration (e.g., settings, etc.) of the near end codec 104 may be assigned (e.g., automatic assignment or manual assignment) via hardware, software, etc.

As mentioned above, the far end controller 110 compares at least one signal level value of the videoconferencing signal to a calibration target according to at least one calibration adjustment rule. The signal level value could include any suitable parameter of a videoconferencing signal, such as a sound pressure level (dB SPL) value, a dBU value, a dBV value, a decibels relative to full scale (dB FS) value, a real time analyzation (RTA) of frequency level, an equalization value of frequency, a time domain value, a time delay value, a video resolution value (e.g., 720p, 1080p, etc.), a video frame rate value, a video color value, a video color bit depth value, a video signal type value, an audio signal type value, etc.

The near end codec 104 and the far end codec 106 may include any suitable videoconferencing codecs (e.g., coder, decoder, etc.). For example, the codecs 104 and 106 can comprise room-based component codecs, mobile cart-based codecs, mobile phone-based codecs, mobile tablet-based codecs, etc. A videoconferencing codec may refer to a coder/decoder for audio only, a coder/decoder for audio and video conferencing calls, etc. The videoconferencing codec may be part of a conferencing system used to transmit and receive audio information only through a codec, to transmit and receive audio and video information through a codec, etc.

As mentioned above, the near end controller 108 receives a determined calibration adjustment value from the far end controller 110, and adjusts a signal level setting of the near end codec 104 according to the determined calibration adjustment value received from the far end controller 110. The near end controller 108 may be configured to save one or more adjusted signal level settings of the near end codec 104, and transmit the saved one or more signal level settings to the far end controller 110. This can allow the far end controller 110 to store adjusted signal level settings of the near end codec 104 for later use with the near end codec 104 as desired, to improve calibration of subsequent near end codecs, for documentation, for archival purposes, for reporting purposes, etc.

The codecs, controllers, videoconferencing components, etc. described herein may be configured to perform operations using any suitable combination of hardware and software. For example, the codecs, controllers, videoconferencing components, etc. may include any suitable circuitry, logic gates, microprocessor(s), computer-executable instructions stored in memory, etc. operable to cause the codecs, controllers, videoconferencing components, etc. to perform actions described herein (e.g., controlling the videoconferencing component 102 to transmit a videoconferencing signal to the near end codec 104 through the videoconferencing connection 105, etc.). In some embodiments, each of the controllers 108 and 110 may comprise a specific device, a computer, software running on a device (e.g., a codec), etc. As mentioned throughout, the codecs, controllers and system components can be integrated in the same device, distributed across multiple different devices, etc.

Figure 2:
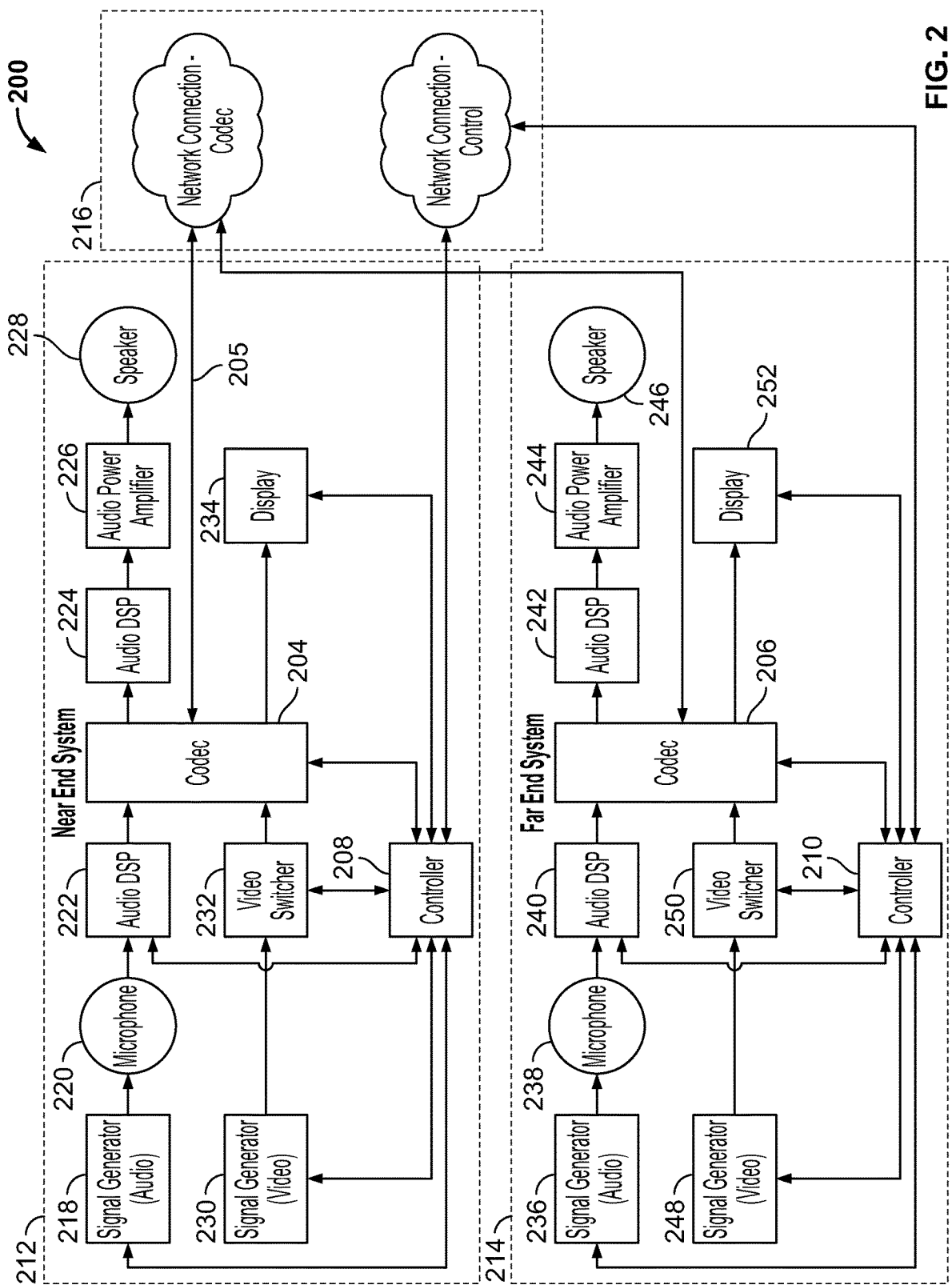
FIG. 2 is a block diagram of a videoconferencing calibration system including audio and video components, according to another example embodiment of the present disclosure.

FIG. 2 illustrates an example videoconferencing calibration system 200 according to another aspect of the present disclosure. As shown in FIG. 2, the system 200 includes a near end system 212 having a near end codec 204 and a near end controller 208. The videoconferencing calibration system 200 also includes a far end system 214 having a far end codec 206 and a far end controller 210.

The near end codec 204 transmits and/or receives a videoconferencing signal to/from the far end codec 206 via a videoconferencing connection 205 on the network 216. The near end controller 208 communicates with the far end controller 210 via the network 216. Although FIG. 2 illustrates the codecs 204 and 206 communicating via a separate network connection than the controllers 208 and 210, in other embodiments the codecs 204 and 206 may communicate with one another via the same network connection as the controllers 208 and 210.

Communication may be unidirectional or bidirectional between the codecs 204 and 206, and between the controllers 208 and 210. For example, the far end controller 210 may control the far end codec 206 to transmit a videoconferencing signal to the near end codec 204 via the videoconferencing connection 205. The near end controller 208 can then analyze the videoconferencing signal received by the near end codec 204 to determine a calibration adjustment value, and adjust the near end codec based on the determined calibration adjustment value.

The near end system 212 includes an audio signal generator 218. The near end controller 208 is configured to control the audio signal generator 218 to provide a calibrated signal to a microphone 220. The resulting output signal from the microphone 220 is then sent to the near end codec 204 through an input audio digital signal processor (DSP) 222.

The near end codec 204 transmits the signal from the input audio DSP 222 to the output audio DSP 224. The output audio DSP 224 transmits a signal to an audio power amplifier 226, which powers a speaker 228 to play the audio signal.

Therefore, one or more signal generators may be used to provide calibrated signal(s) to one or more videoconferencing components. As shown in FIG. 2, the near end system 212 also includes a video signal generator 230. The near end controller 208 controls the video signal generator 230 to provide a calibrated signal to a video switcher 232. The video switcher 232 then transmits a signal to the near end codec 204, and the near end codec 204 provides a video signal to be displayed on the display 234.

The near end codec 204 may transmit the audio signal from audio DSP 222 and/or the video signal from the video switcher 232 to the far end codec 206, via the videoconferencing connection 205.

Similar to the near end system 212, the far end system 214 includes an audio signal generator 236 which provides a calibrated signal to a microphone 238, and the output of the microphone is transmitted to the far end codec 206 via the input audio DSP 240. The far end codec 206 then transmits an output audio signal to the speaker 246 via the output audio DSP 242 and the audio power amplifier 244.

The far end system 214 also includes a video signal generator 248 which provides a calibrated signal to the video switcher 250. The far end codec 206 receives the output of the video switcher 250, and provides a signal to display 252. The far end codec 206 may provide the received audio and/or video signals to the near end codec 204 via the videoconferencing connection 205.

The near end controller 208 and the far end controller 210 may communicate via the network 216 to transmit determined calibration adjustment values, etc. between one another as described above relative to system 100 of FIG. 1, to implement automatic calibration of videoconferencing system 200.

As shown in FIG. 2, the near end controller 208 is in communication with the display 234. The near end controller 208 may control the video signal generator 230 to transmit a local video conferencing signal to the display through the near end codec 204, and then analyze the local videoconferencing signal received at the display 234 to determine a local calibration adjustment value. The near end controller can then adjust a local level setting of the near end codec 204 according to the determined local calibration adjustment value.

Although FIG. 2 illustrates a speaker 228 and a display 234, other embodiments may include other suitable output components for setting local calibration levels of the near end codec 204. Similarly, other embodiments may include signal generators other than audio signal generator 218 and video signal generator 230.

As described above, the near end controller 208 is in communication with the audio signal generator 218, and may be configured to control the audio signal generator 218 to provide a calibrated signal to the microphone 220. As shown in FIG. 2, the near end controller 208 can also be connected to the audio DSP 222. In this case, the near end controller 208 may control the audio DSP 222 directly to provide a calibrated signal to the near end codec 204. Similarly, the near end controller 208 can be connected with the video switcher 232 to control the video switcher 232 directly to provide a calibrated signal to the near end codec 204.

The system 200 may implement any number of suitable calibration tests. For example, audio signals generated by the audio signal generator 218 can be played through the near end codec 204 and received by the near end microphone 220, to calibrate local settings of the near end system 212.

Audio signals generated by the audio signal generator 218 can be sent through the near end codec 204 to the far end codec 206 via the videoconferencing connection 205 (e.g., a videoconferencing call). The far end controller 210 can then pass information to the near end controller 208, to adjust levels in the near end codec 204 for audio. Once generated audio levels from the near end system 212 are in agreement with calibrated target levels at the far end system 214, the near end system 212 may be considered as calibrated for audio transmission.

Audio signals generated by the audio signal generator 236 can be sent through the far end codec 206 to the near end codec 204 via the videoconferencing connection 205. The far end controller 210 can then pass information to the near end controller 208, to adjust levels in the near end codec 204 for audio. Once generated audio levels from the far end system 214 are in agreement with calibrated target levels at the near end system 212, the near end system 212 may be considered as calibrated for audio reception.

Calibration tests may be performed for video signals. For example, video signals generated by the video signal generator 230 can be sent through the near end codec 204 to the far end codec 206 via the videoconferencing connection 205. The far end controller 210 can then pass information to the near end controller 208, to adjust levels in the near end codec 204 for video. Once generated video levels from the near end system 212 are in agreement with calibrated target levels at the far end system 214, the near end system 212 may be considered calibrated for video transmission.

Video signals generated by the video signal generator 248 can be sent through the far end codec 206 to the near end codec 204 via the videoconferencing connection 205. The far end controller 210 can then pass information to the near end controller 208, to adjust levels in the near end codec 204 for video. Once generated video levels from the far end system 214 are in agreement with calibrated target levels at the near end system 212, the near end system 212 may be considered as calibrated for video reception.

As another test, a system administrator can evaluate all signal levels (e.g., audio, video, etc. as applicable) to check that calibrated signal levels reside within calibrated target values, are within a correct perception range for end users, etc. This may be considered as a 'sanity check'. If levels need to be adjusted during this test, the system administrator can make the changes for acceptable human perception before the calibrated configuration is considered complete. Once all calibration tests are complete, results from the calibration tests can be formatted and sent from the near end controller 208 to the far end controller 210 for archival purposes, reporting purposes, etc. The system administrator can be a human, a software program, etc. for determining success or failure of a given calibration test, and associating specific target values for a calibration test.

Figure 3:
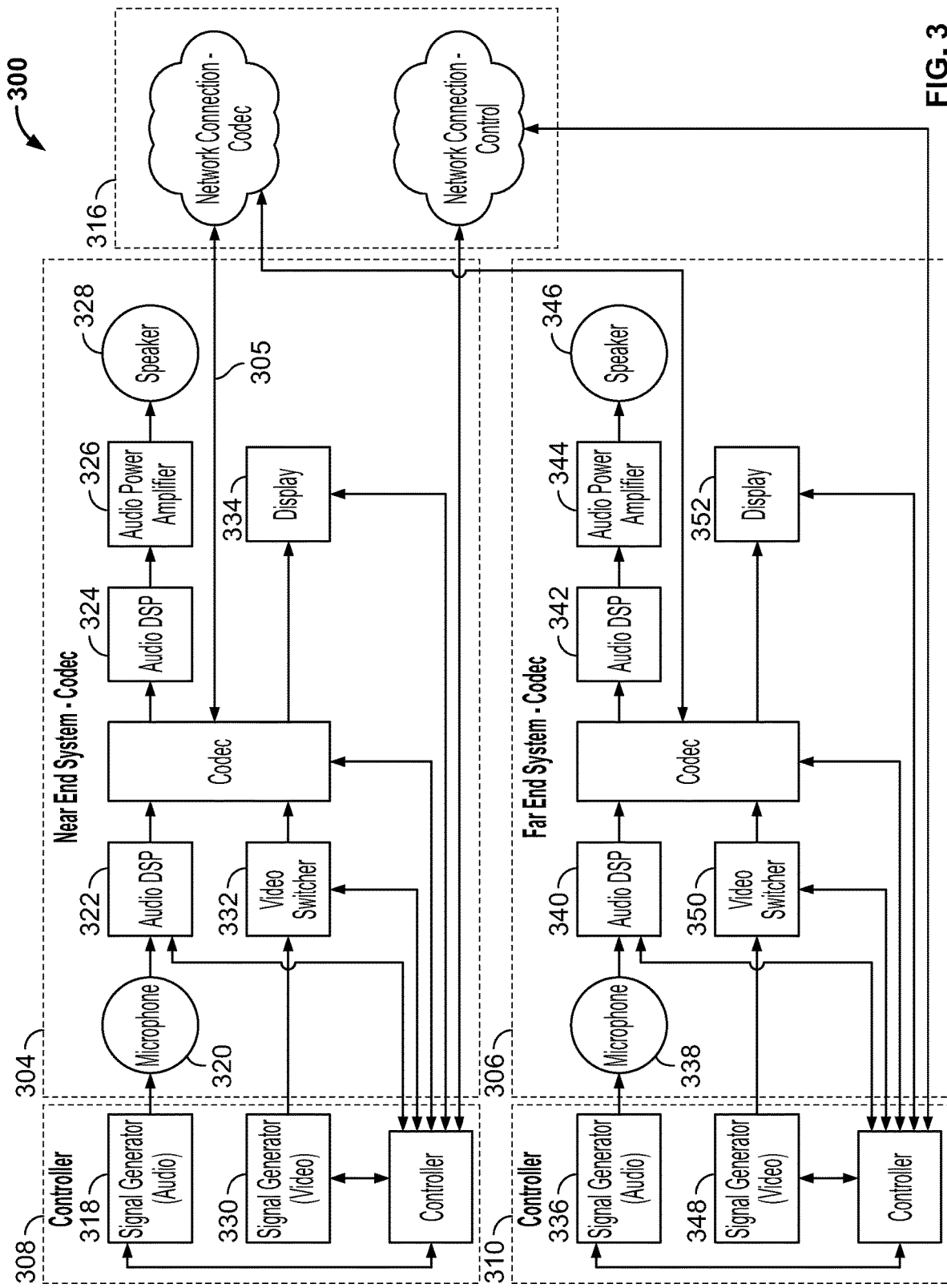
FIG. 3 is a block diagram of a videoconferencing calibration system including an audio signal generator and a video signal generator integrated in the controller, according to another example embodiment of the present disclosure.

FIG. 2 illustrates the near end system 212 as including the near end codec 204 and the near end controller 208, and the far end system 214 as including the far end codec 206 and the far end controller 210. As another option, some components of the near end system may be included in the near codec, with the near end controller separate from the near codec. FIG. 3 illustrates a videoconferencing calibration system 300 where the near end system codec 304 includes a microphone 320, an audio DSP 322, an audio DSP 324, an audio power amplifier 326, a speaker 328, a video switcher 332, and a display 334. The components of the near end system codec 304 may be integrated into the same physical device (e.g., the same computing device, etc.).

As shown in FIG. 3, a near end controller 308 includes an audio signal generator 318 and a video signal generator 330. For example, the audio signal generator 318 and video signal generator 330 may be integrated in the same physical device of the near end controller 308.

The near end controller 308 is in communication with the near end system codec 304, and controls the near end system codec 304 to transmit videoconferencing signal(s) to the far end system codec 306 via a videoconferencing connection 305. The videoconferencing connection 305 may be transmitted via network 316.

The videoconferencing system 300 also includes a far end system codec 306. The far end system codec 306 includes a microphone 338, audio DSP 340, audio DSP 342, audio power amplifier 344, speaker 346, video switcher 350 and display 352. These components may be integrated in a same device of the far end system codec 306.

A far end controller 310 is in communication with the far end system codec 306. The far end controller 310 includes an audio signal generator 318 and a video signal generator 330, which may be integrated in the same physical device of the near end controller 308.

Figure 4:
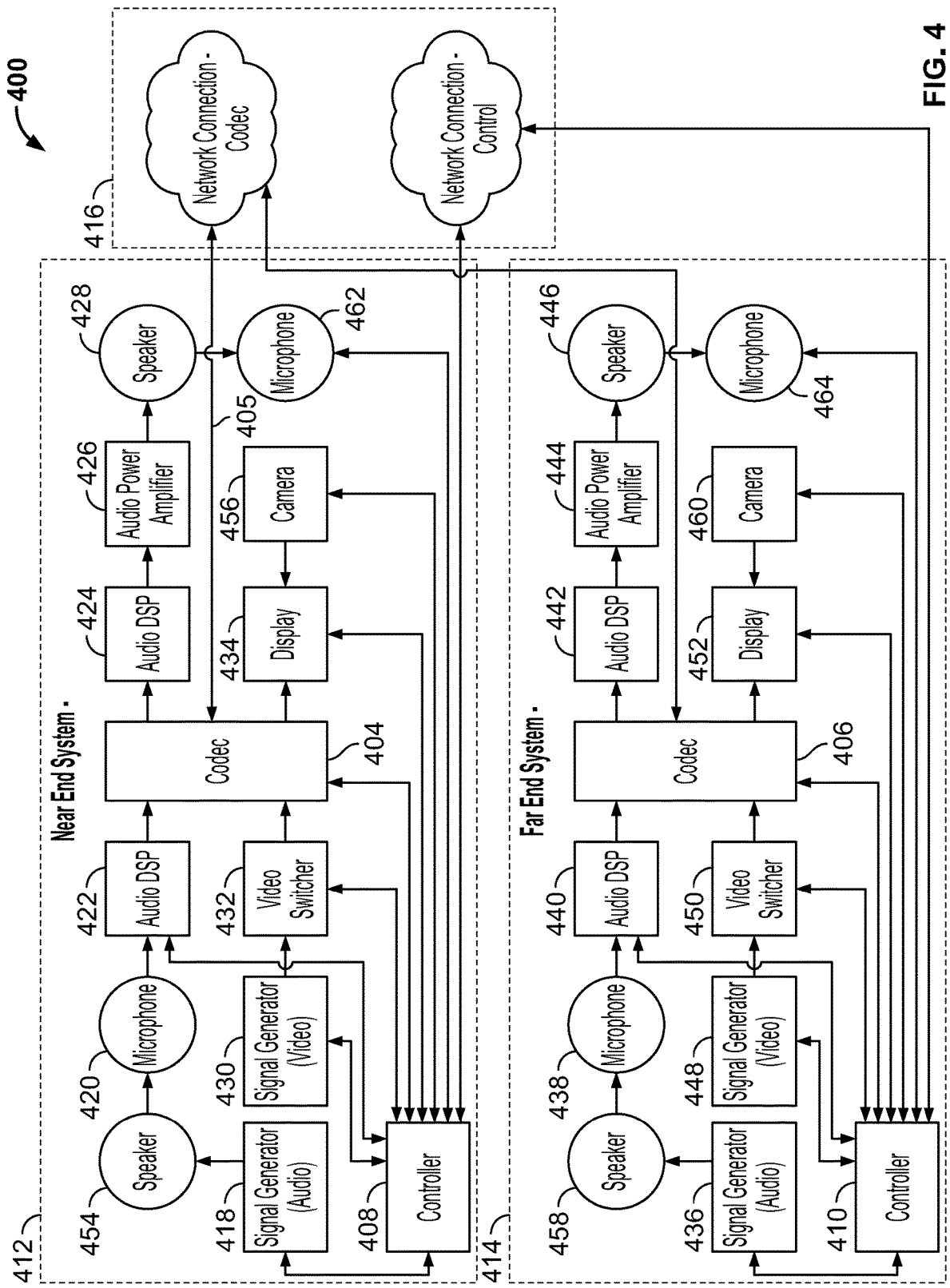
FIG. 4 is a block diagram of a videoconferencing calibration system including a microphone connected with the controller on a near end of the system, according to another example embodiment of the present disclosure.

As another option, a codec, controller, and videoconferencing components could all be integrated in a single system. As shown in FIG. 4, a videoconferencing calibration system 400 includes a near end system 412 and a far end system 414. The near end system 412 is configured to transmit a videoconferencing signal to the far end system 414 via a videoconferencing connection 405 on the network 416.

As shown in FIG. 4, the near end system 412 includes an audio signal generator 418 configured to supply a calibrated signal to a speaker 454. The speaker 454 outputs sound to a microphone 420, which provides a signal to an audio DSP 422. A near end codec 404 is coupled between the audio DSP 422 and an audio DSP 424.

The audio DSP 424 outputs a signal to an audio power amplifier 426, which plays sound through a speaker 428. A microphone 462 detects sound from the speaker 428, which is fed back to the near end controller 408. The near end controller 408 can use the detected sound for local calibration, etc.

The near end system 412 also includes a video signal generator 430, a video switcher 432, a display 434 and a camera 456. The camera 456 may capture images from the display 434, and feed the captured images back to the near end controller 408 for local calibration, etc.

The far end system 414 includes an audio signal generator 436 configured to supply a calibrated signal to a speaker 458. The speaker 458 outputs sound to a microphone 438, which provides a signal to an input audio DSP 440. A far end codec 406 is coupled between the input audio DSP 440 and an output audio DSP 442.

The output audio DSP 442 outputs a signal to an audio power amplifier 444, which plays sound through a speaker 446. A microphone 464 detects sound from the speaker 446, which is fed back to the far end controller 410. The far end controller 410 can use the detected sound for local calibration, etc.

The far end system 414 also includes a video signal generator 448, a video switcher 450, a display 452 and a camera 460. The camera 460 may capture images from the display 452, and feed the captured images back to the far end controller 410 for local calibration, etc.

As described herein, microphones can include any suitable audio device capable of audio pickup local to the area (e.g., room, etc.) in which the microphone resides. The microphone may be a test (e.g., measurement) microphone calibrated for specific audio levels, a non-calibrated device, part of a codec that may or may not be calibrated, etc.

Example speakers can include audio devices that reproduce audio into a local area in which the speaker resides. The speaker can be internal to a codec, a display, a room, a codec component, etc. Alternatively, the speaker may be external to a codec as a standalone speaker device.

Displays may include suitable video devices that project visual data, render visual data, etc. into a local area in which the display resides. The display may be internal to a codec, a room, a codec component, etc. Alternatively, the display may be external to the component, such as a projector, an LCD television, an LED television, an OLED display, etc.

Digital signal processors (DSPs) described herein can include audio and/or video devices used for routing, processing, etc. audio and/or video signals. Video switchers can include video devices used for routing, processing, etc. video signals. Similar to above, the DSPs and video switchers may be internal to a codec, may be a specific external component, may be implemented in software and/or hardware as part of a codec or system component, etc.

Example cameras can include any suitable video devices capable of video pickup local to the area in which the camera resides. For example, the camera may be a test (e.g., measurement) camera calibrated for specific visual levels, a non-calibrated device, part of a codec that may or may not be calibrated, etc. The device may be internal to a codec, a display, a room, a codec component, etc. Alternatively, the camera may be external to the codec as a standalone camera, part of another system component, etc.

The signal generators described herein can include suitable devices capable of generating audio and/or video signals at calibrated levels, calibrated resolutions, etc. The signal generators may comprise a specific device, multiple devices grouped together, a computer, software running on a device (e.g., a codec), etc.

Figure 5:
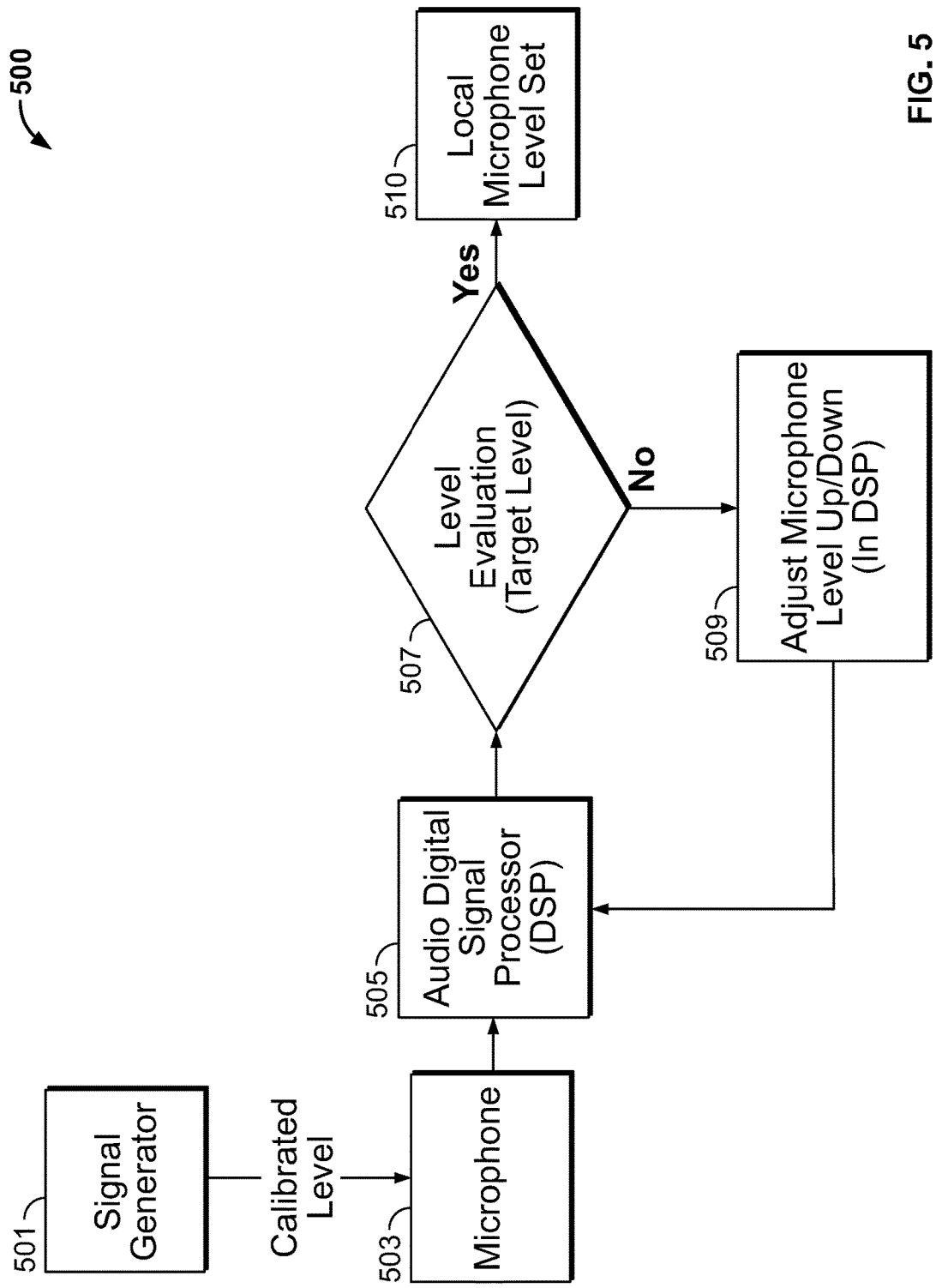
FIG. 5 is a flow chart of a method for calibrating a near end microphone, according to another example embodiment of the present disclosure.

FIG. 5 illustrates an example process 500 for calibration of a near end microphone. As shown in FIG. 5, a signal generator 501 provides a calibrated signal (e.g., a signal having a calibrated level) to a microphone 503. The output of the microphone 503 is fed to an audio digital signal processor (DSP) 505. At 507, level evaluation is performed to compare the signal from audio DSP 505 to a target level.

If the signal is not at approximately the target level, at 509, a level of the microphone 503 is adjusted up or down accordingly in the audio DSP 505. The process 500 then returns to the audio DSP 505 to compare the adjusted signal level to the target level at 507. If the signal is at the target level at 507, a local microphone level is set at 510. If there are multiple local microphones in the system, the local microphone calibration process 500 may be repeated for each microphone in the system.

Figure 6:
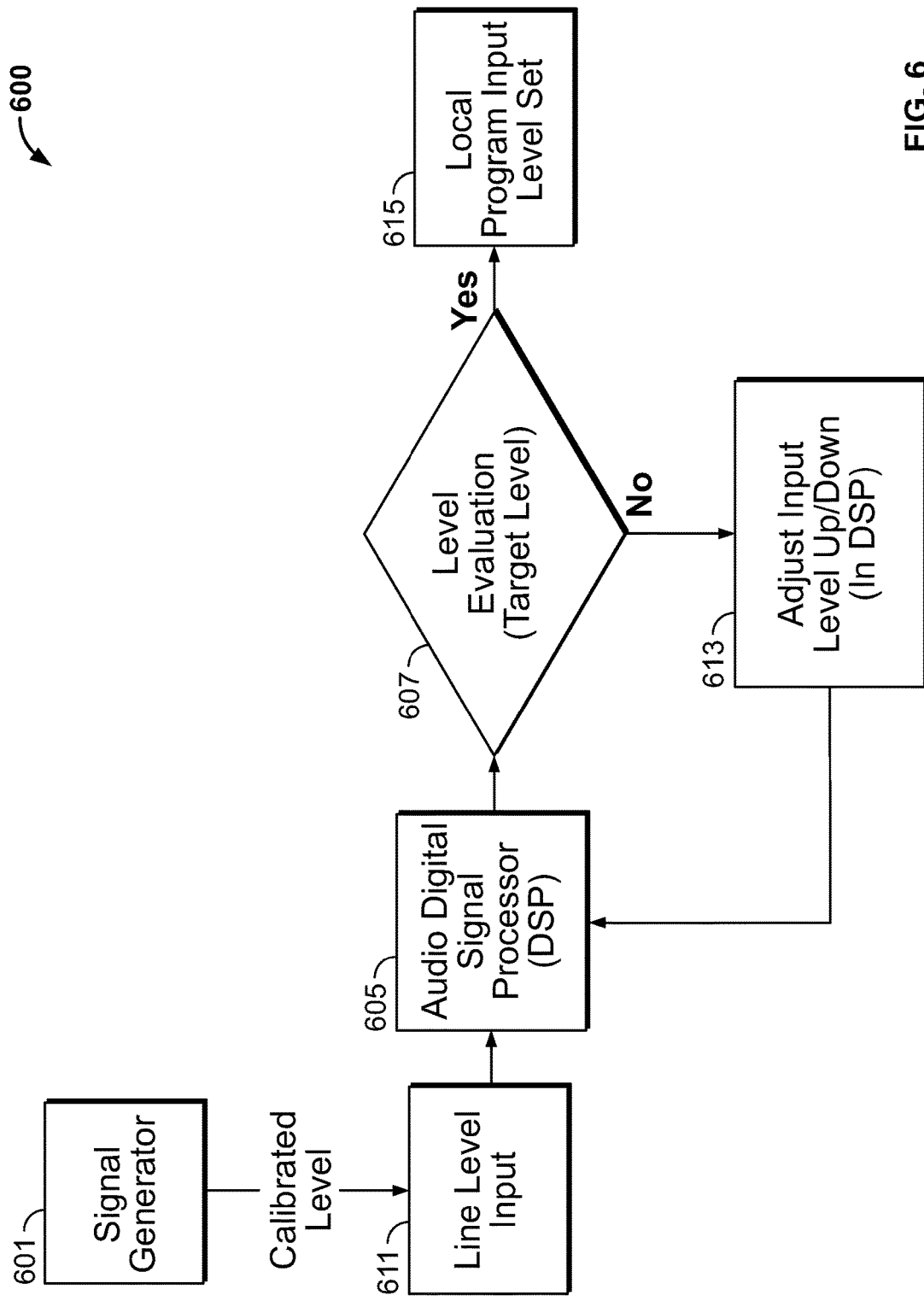
FIG. 6 is a flow chart of a method for calibrating a near end program input audio signal, according to another example embodiment of the present disclosure.

FIG. 6 illustrates an example process 600 for audio calibration of a near end line level input. As shown in FIG. 6, a signal generator 601 provides a calibrated signal to a line level input 611. The output of the line level input 611 is fed to an audio digital signal processor (DSP) 605. At 507, level evaluation is performed to compare the signal from audio DSP 505 to a target level.

If the signal is not at approximately the target level, at 509, a level of the line level input 611 is adjusted up or down accordingly in the audio DSP 605. The process 600 then returns to the audio DSP 605 to compare the adjusted signal level to the target level at 607. If the signal is at the target level at 607, a local program value of the line level input 611 is set at 615. If there are multiple content inputs in the system, the calibration process 600 may be repeated for each content input in the system.

Figure 7:
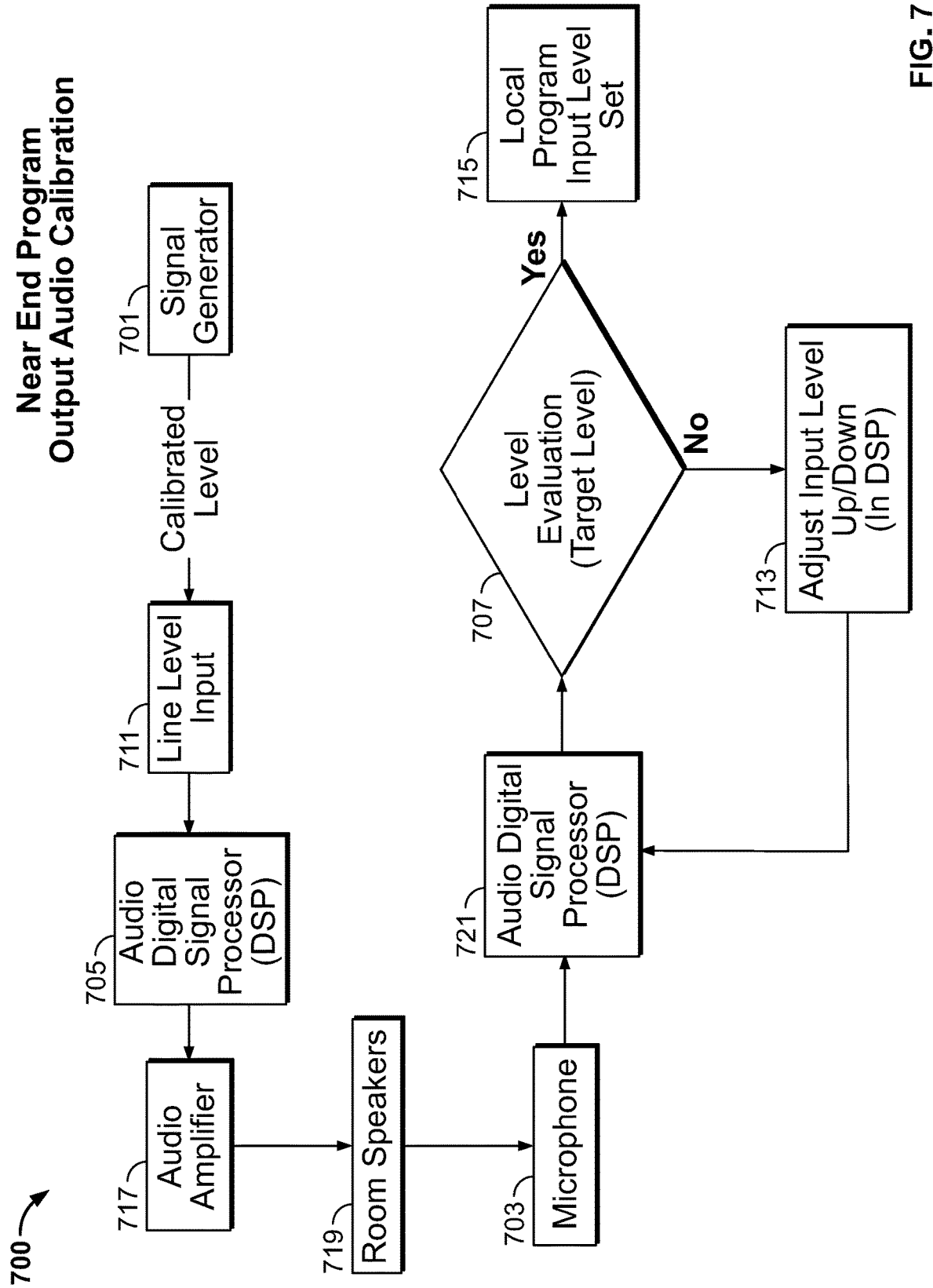
FIG. 7 is a flow chart of a method for calibrating a near end program output audio signal, according to another example embodiment of the present disclosure.

FIG. 7 illustrates an example process 700 for near end program output audio calibration. As shown in FIG. 7, a signal generator 701 provides a calibrated signal to a line level input 711. The output of the line level input 711 is fed to an audio digital signal processor (DSP) 705. The audio DSP 705 provides a signal to the audio amplifier 717, which plays sound through room speakers 719. The sound from room speakers 719 is detected by microphone 703, and input to an audio DSP 721.

At 707, level evaluation is performed to compare the signal from audio DSP 721 to a target level. If the signal is not at approximately the target level, at 713, a level of the line level input 711 is adjusted up or down accordingly in the audio DSP 705. The process 700 then returns to the audio DSP 721 to compare the adjusted signal level to the target level at 707. If the signal is at the target level at 707, a local program value of the line level input 711 is set at 715. If there are multiple content inputs in the system, the calibration process 700 may be repeated for each content input in the system.

Figure 8:
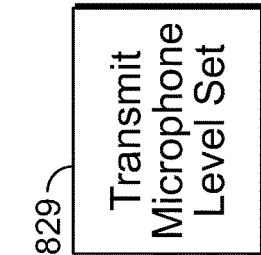
FIG. 8 is a flow chart of a method for calibrating a near end microphone transmission, according to another example embodiment of the present disclosure.
Figure 8:
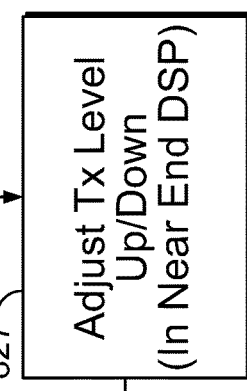
Figure 8:
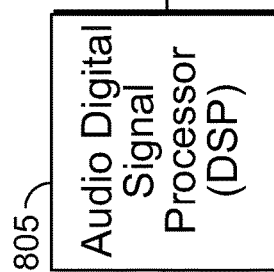
Figure 8:
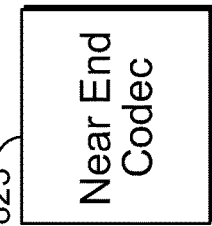

FIG. 8 illustrates an example process 800 for calibration of a near end microphone transmission. As shown in FIG. 8, a near end codec 823 provides a calibrated signal to a far end codec 825. The output of the far end codec 825 is fed to an audio digital signal processor (DSP) 805. At 807, level evaluation is performed to compare the signal from audio DSP 805 to a target level.

If the signal is not at approximately the target level, at 827, a transmit level of the near end codec 823 is adjusted up or down accordingly in an audio DSP of the near end codec 823. The process 800 then returns to the audio DSP 805 to compare the adjusted signal level to the target level at 807. If the signal is at the target level at 807, a transmit microphone level is set at 829. If there are multiple microphones in the system, the calibration process 800 may be repeated for each microphone in the system.

Figure 9:
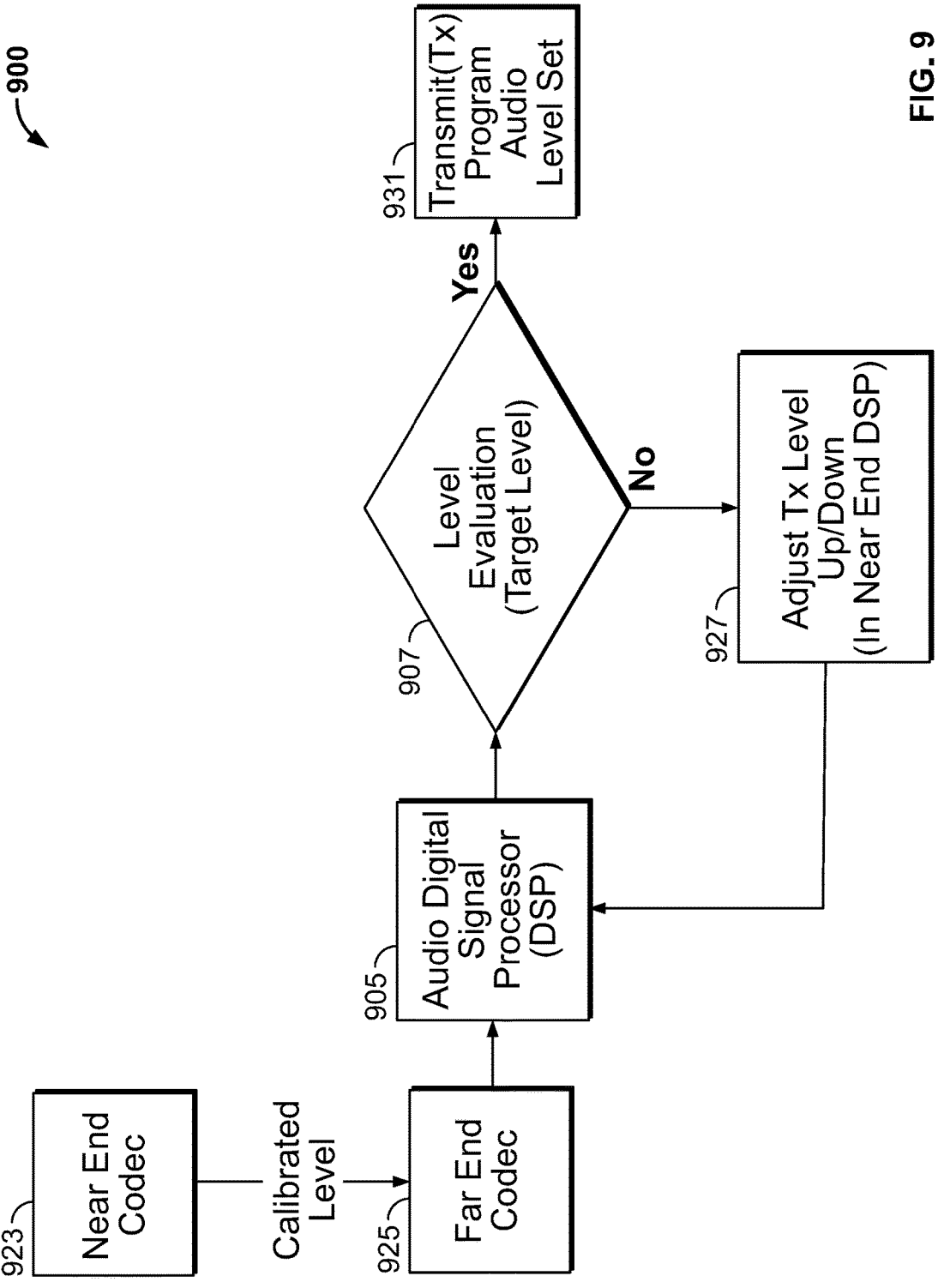
FIG. 9 is a flow chart of a method for calibrating a near end program audio transmission, according to another example embodiment of the present disclosure.

FIG. 9 illustrates an example process 900 for calibration of a near end program audio transmission. As shown in FIG. 9, a near end codec 923 provides a calibrated signal to a far end codec 925. The output of the far end codec 925 is fed to an audio digital signal processor (DSP) 905. At 907, level evaluation is performed to compare the signal from audio DSP 905 to a target level.

If the signal is not at approximately the target level, at 927, a transmit level of the near end codec 923 is adjusted up or down accordingly in an audio DSP of the near end codec 923. The process 900 then returns to the audio DSP 905 to compare the adjusted signal level to the target level at 907. If the signal is at the target level at 907, a transmit (Tx) program audio level is set at 931. If there are multiple microphones in the system, the calibration process 900 may be repeated for each microphone in the system.

Figure 10:
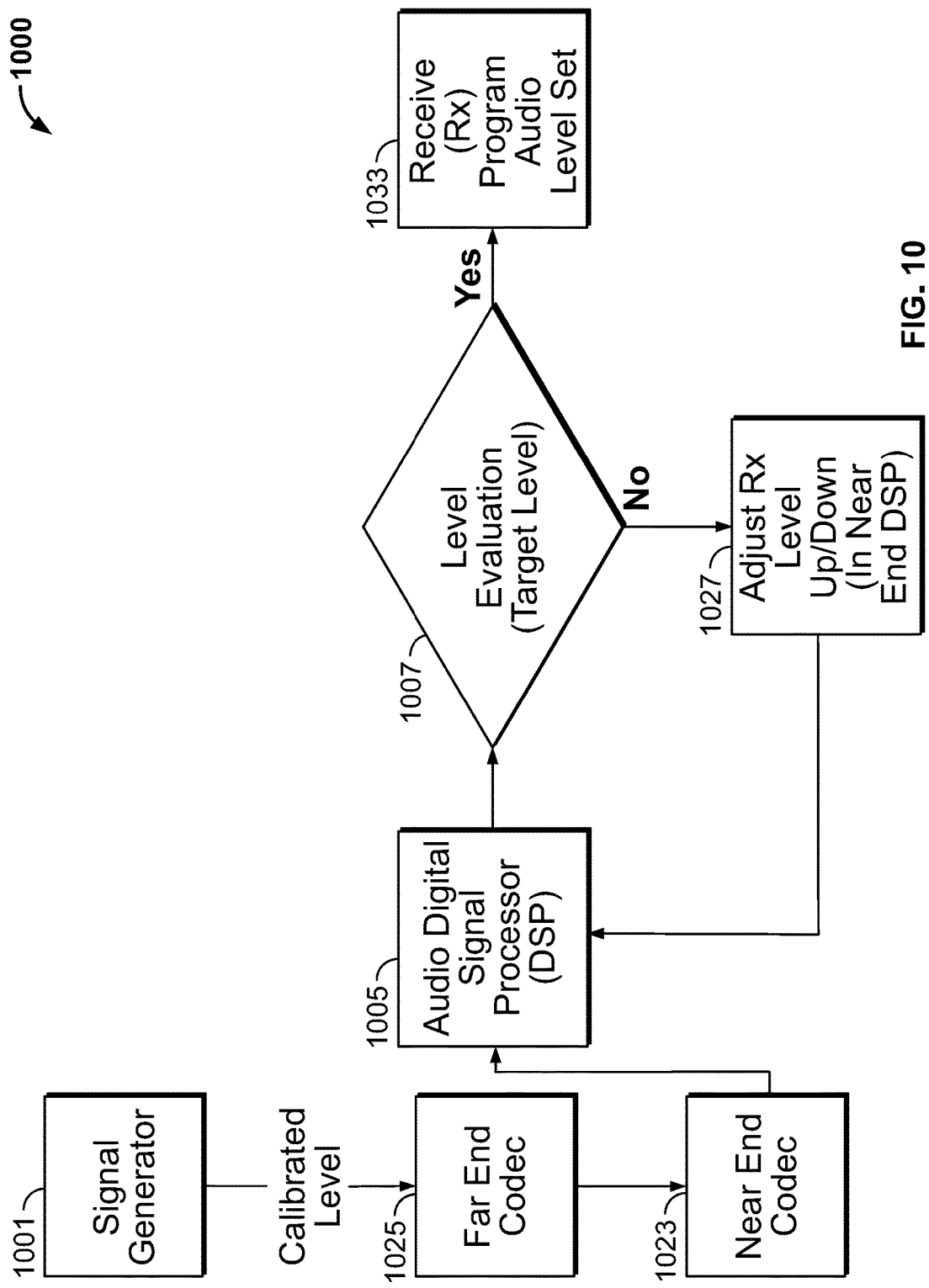
FIG. 10 is a flow chart of a method for calibrating a near end program audio receive signal, according to another example embodiment of the present disclosure.

FIG. 10 illustrates an example process 1000 for near end audio receive calibration. As shown in FIG. 10, a signal generator 1001 provides a calibrated signal to a far end codec 1025. The far end codec 1025 transmits a signal to a near end codec 1023. An output of the near end codec 1023 is fed to an audio DSP 1005. At 1007, level evaluation is performed to compare the signal from audio DSP 1005 to a target level.

If the signal is not at approximately the target level, at 1027, a receive (Rx) level of the near end codec 1023 is adjusted up or down accordingly in the audio DSP 1005 of the near end codec 1023. The process 1000 then returns to the audio DSP 1005 to compare the adjusted signal level to the target level at 1007. If the signal is at the target level at 1007, a receive (Rx) program audio level is set at 1033.

Figure 11:
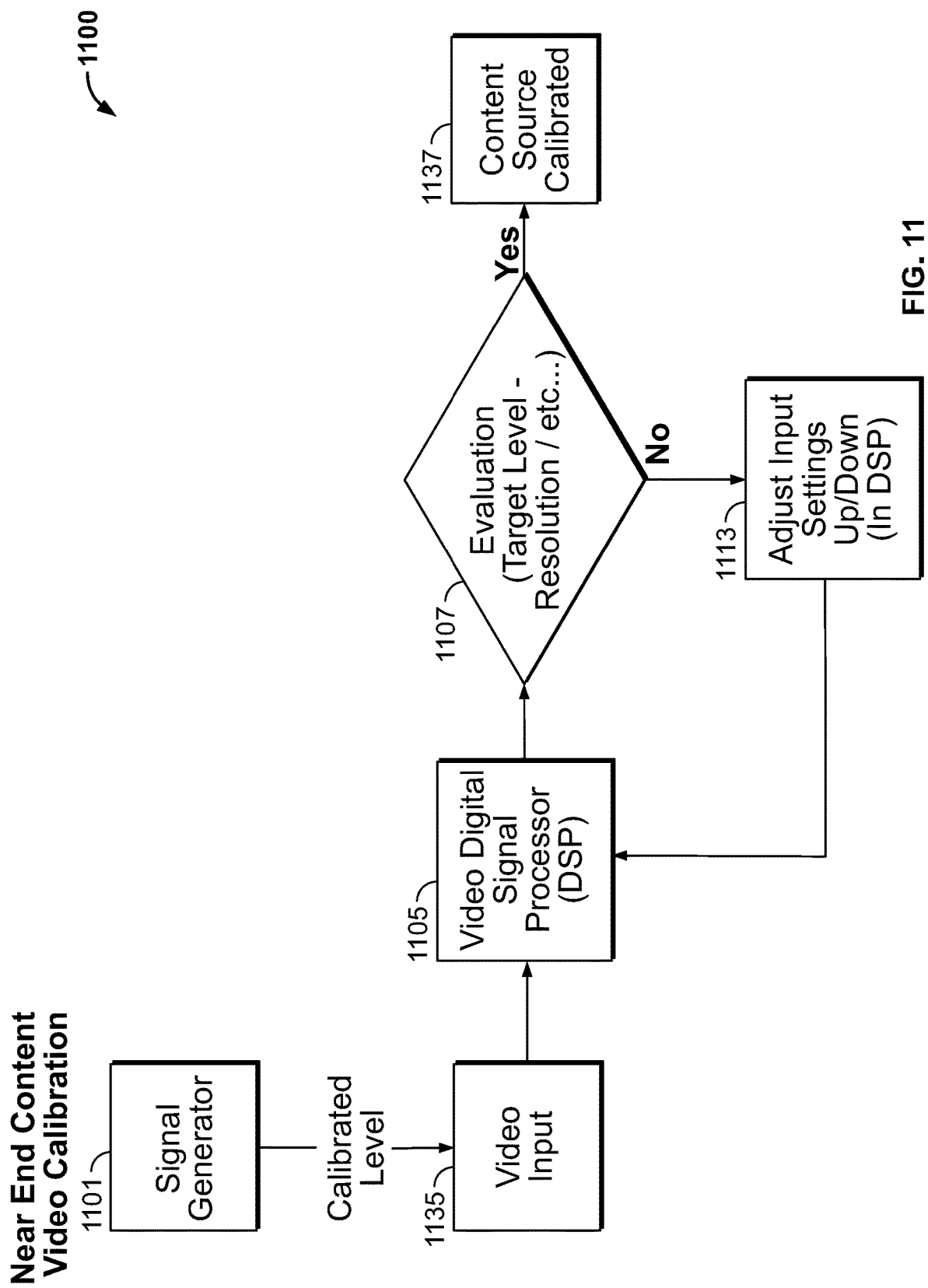
FIG. 11 is a flow chart of a method for calibrating a near end content video signal, according to another example embodiment of the present disclosure.

Referring now to example processes for video calibration, FIG. 11 illustrates an example process 1100 for calibration of near end content video. As shown in FIG. 11, a signal generator 1101 provides a calibrated signal to a video input 1135. The output of the video input 1135 is fed to a video DSP 1105. At 1107, level evaluation is performed to compare the signal from video DSP 1105 to a target level (e.g., resolution, etc.).

If the signal is not at approximately the target level, at 1109, input settings are adjusted up or down accordingly in the video DSP 1105. The process 1100 then returns to the video DSP 1105 to compare the adjusted signal level to the target level at 1107. If the signal is at the target level at 1107, a calibration of the content source is determined at 1137. If there are multiple content inputs in the system, the calibration process 1100 may be repeated for each content input in the system.

Figure 12:
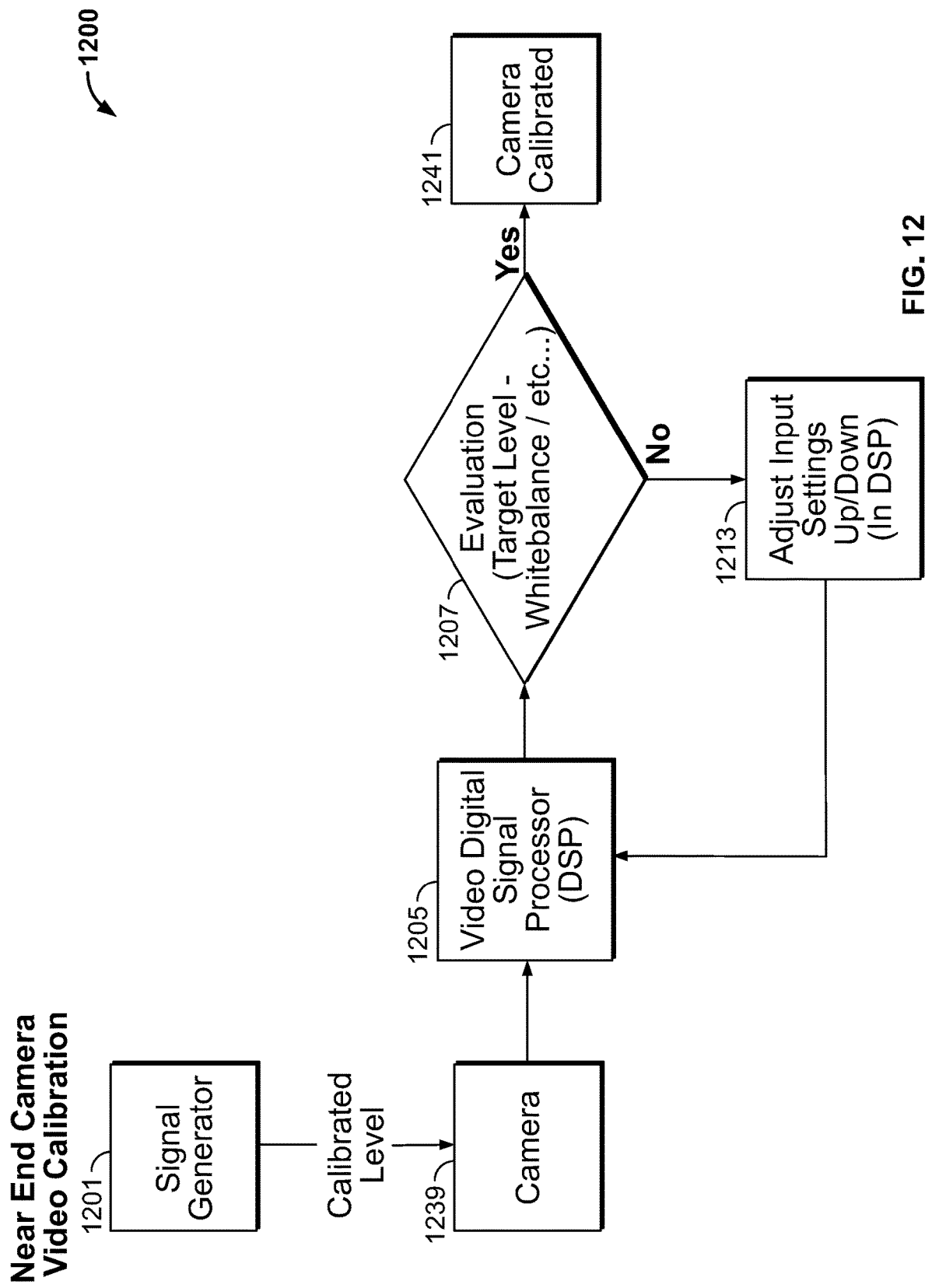
FIG. 12 is a flow chart of a method for calibrating a near end camera video signal, according to another example embodiment of the present disclosure.

FIG. 12 illustrates an example process 1200 for calibration of a near end camera. As shown in FIG. 12, a signal generator 1201 provides a calibrated signal to a camera 1239. The output of the camera 1239 is fed to a video DSP 1205. At 1207, level evaluation is performed to compare the signal from the video DSP 1205 to a target level.

If the signal is not at approximately the target level, at 1209, input settings are adjusted up or down accordingly in the video DSP 1205. The process 1200 then returns to the video DSP 1205 to compare the adjusted signal level to the target level at 1207. If the signal is at the target level at 1207, a calibration of the camera 1239 is determined at 1237. If there are multiple camera inputs in the system, the calibration process 1200 may be repeated for each camera input in the system.

Figure 13:
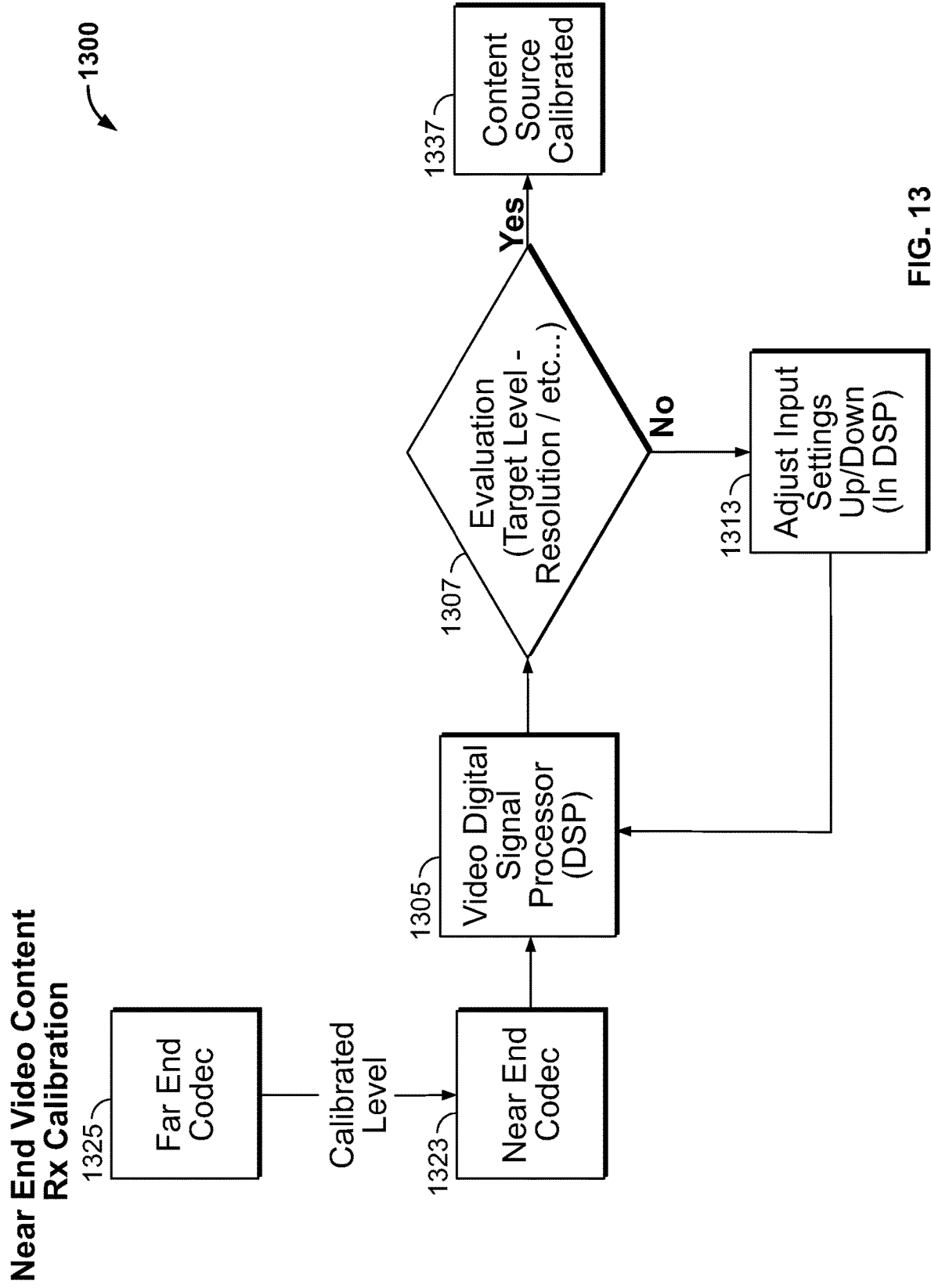
FIG. 13 is a flow chart of a method for calibrating a near end video content receive signal, according to another example embodiment of the present disclosure.

FIG. 13 illustrates an example process 1300 for near end video content receive calibration. As shown in FIG. 13, a far end codec 1325 provides a calibrated signal to a near end codec 1323. The output of the near end codec 1323 is fed to a video DSP 1305. At 1307, level evaluation is performed to compare the signal from the video DSP 1305 to a target level.

If the signal is not at approximately the target level, at 1309, input settings are adjusted up or down accordingly in the video DSP 1305. The process 1300 then returns to the video DSP 1305 to compare the adjusted signal level to the target level at 1307. If the signal is at the target level at 1307, a calibration of the content source is determined at 1337. If there are multiple content inputs in the system, the calibration process 1300 may be repeated for each content input in the system.

Figure 14:
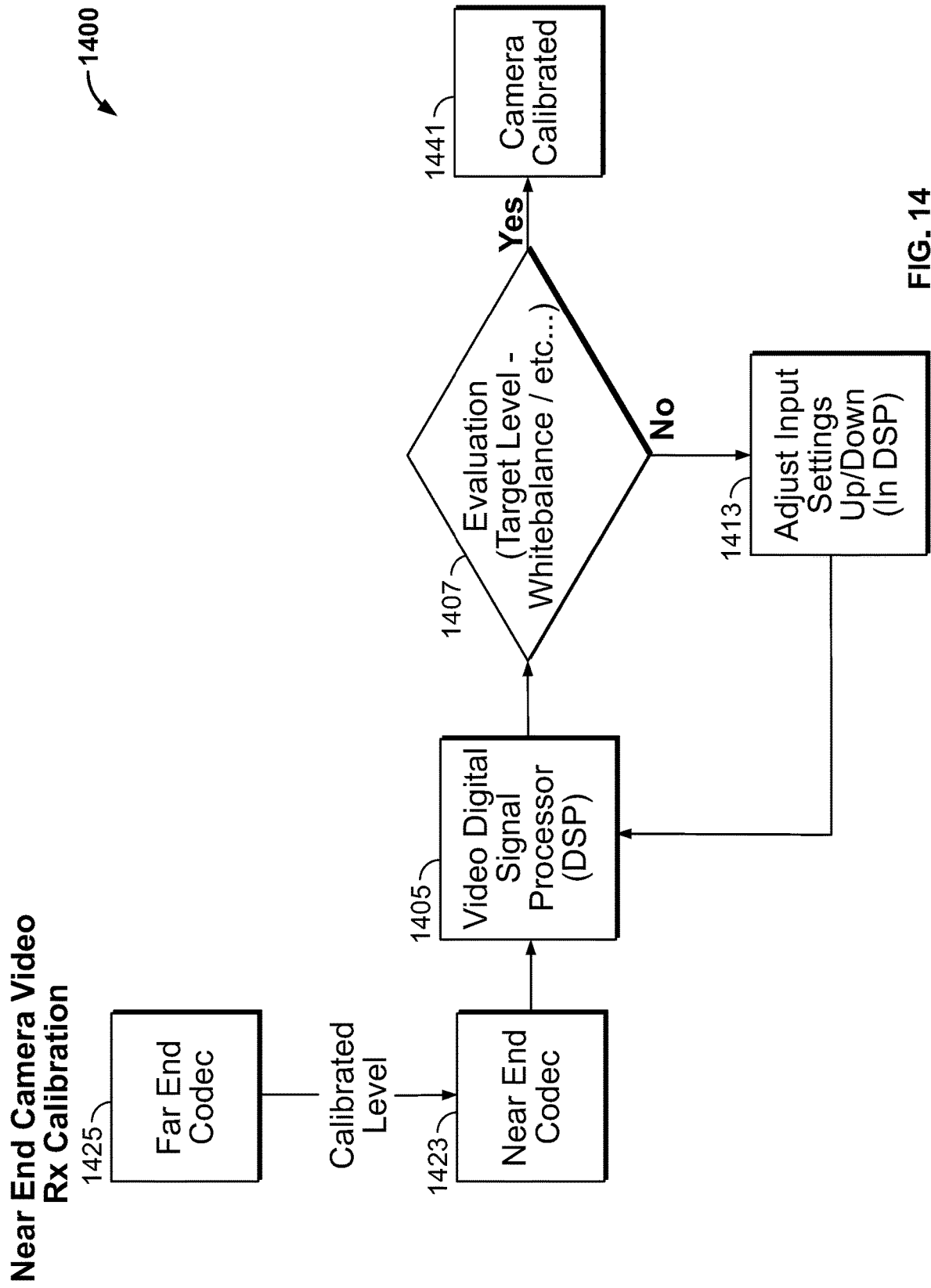
FIG. 14 is a flow chart of a method for calibrating a near end camera video receive signal, according to another example embodiment of the present disclosure.

FIG. 14 illustrates an example process 1400 for calibration of a near end camera. As shown in FIG. 14, a far end codec 1425 provides a calibrated signal to a near end codec 1423. The output of the near end codec 1423 is fed to a video DSP 1405. At 1407, level evaluation is performed to compare the signal from the video DSP 1405 to a target level.

If the signal is not at approximately the target level, at 1409, input settings are adjusted up or down accordingly in the video DSP 1405. The process 1400 then returns to the video DSP 1405 to compare the adjusted signal level to the target level at 1407. If the signal is at the target level at 1407, a calibration of a camera is determined at 1441. If there are multiple camera inputs in the system, the calibration process 1400 may be repeated for each camera input in the system.

FIG. 15 illustrates a controller 1500, according to one example embodiment of the present disclosure. The controller 1500 includes a processor 1543 (e.g., an integrated circuit chip, etc.), in communication with memory 1545 (e.g., random access memory, etc.). The processor 1543 may be configured to execute computer-executable instructions stored in the memory 1545 to perform example methods described herein, etc.

The controller 1500 includes a wireless interface 1547, which may include one or more antennas, etc. for IEEE 802.11 wireless LAN communication, BLUETOOTH communication, etc. The controller 1500 also includes one or more external ports 1549, such as a universal serial bus (USB) port, a general purpose input-output (GPIO) port, an HDMI port, a camera port, a display port, a stereo output port, a composite video output port, a micro SD port, a power supply input, etc.

In some embodiments, the controller 1500 may connect with a codec via an internet protocol (IP) connection (e.g., wired or wireless), to control the codec, adjust settings of the codec, etc. The controller 1500 may connect to a cloud server via an IP connection, may connect to other videoconferencing devices such as a video signal processor through USB, RS232, etc.

According to another aspect of the present disclosure, an exemplary method of calibrating a videoconferencing system is disclosed. The videoconferencing system includes a first controller in communication with a first codec and a second controller in communication with a second codec. The second codec is connected to the first codec though a videoconferencing connection.

The method includes receiving, at the second codec, a videoconferencing signal transmitted by the first codec to the second codec through the videoconferencing connection between the first codec and the second codec. The method also includes analyzing, by the second controller, the videoconferencing signal received at the second codec to determine a calibration adjustment value by comparing at least one signal level value of the videoconferencing signal to a calibration target according to at least one calibration adjustment rule. The method further includes transmitting the determined calibration adjustment value to the first controller to allow the first controller to adjust a signal level setting of the first codec according to the determined calibration adjustment value transmitted by the first controller.

The received videoconferencing signal may be generated by a videoconferencing component in communication with the first codec. For example, the videoconferencing component may include a microphone, an audio digital signal processor, an audio line input, a video switcher, a camera, etc. In some embodiments, the received videoconferencing signal may be based on a calibrated signal provided to the videoconferencing component by a signal generator in communication with the videoconferencing component.

The method may include transmitting, by the second codec, a second videoconferencing signal to the first codec though the videoconferencing connection to allow the first controller to analyze the transmitted second videoconferencing signal to determine a second calibration adjustment value for adjusting a second signal level setting of the first codec. In this case, the transmitted second videoconferencing signal may be generated by a videoconferencing component in communication with the second codec.

According to another aspect of the present disclosure, another exemplary method of calibrating a videoconferencing system is disclosed. The videoconferencing system includes a first controller in communication with a first codec and a second controller in communication with a second codec. The second codec is connected to the first codec though a videoconferencing connection.

The example method includes transmitting, by the first codec, a videoconferencing signal to the second codec through the videoconferencing connection between the first codec and the second codec. The method also includes receiving, by the first controller, a calibration adjustment value from the second controller. The received calibration adjustment value is determined by the second controller by comparing at least one signal level value of the videoconferencing signal received at the second codec to a calibration target according to at least one calibration adjustment rule. The method further includes adjusting, by the first controller, a signal level setting of the first codec using a level adjustment command of the first codec, where the level adjustment command is determined according to the calibration adjustment value transmitted by the second controller.

The method may include initiating, by the first controller, the videoconferencing connection between the first codec and the second codec. In some cases, the method may include saving, by the first controller, adjusted local signal level settings of the first codec. The saved adjusted local signal level settings may be transmitted to the second controller.

The system may include a videoconferencing component in communication with the first codec. In this case, the method may include controlling, by the first controller, the videoconferencing component to transmit the videoconferencing signal to the second codec though the videoconferencing connection. A signal generator may be in communication with the videoconferencing component, with the method further comprising controlling, by the first controller, the signal generator to provide a calibrated signal to the videoconferencing component.

In some embodiments, the system may include an output component coupled between the first codec and the first controller. In this case, the method can include transmitting a local videoconferencing signal to the output component from the first codec, and analyzing the local videoconferencing signal received at the output component to determine a local calibration adjustment value by comparing at least one signal level value of the local videoconferencing signal to a local calibration target according to at least one local calibration adjustment rule. The method may also include adjusting a local signal level setting of the first codec using the level adjustment command of the first codec, where the level adjustment command corresponds to the local calibration adjustment value.

In another example embodiment of a process for automatic videoconferencing calibration, a speaker may be placed at a location of a main participant in a near end room. The speaker may be placed on a stand at an elevation and standard talking distance away from a microphone. The speaker can be set to a standard calibrated tone (e.g., about 60 dB, etc.). A computer can be positioned at presentation location within the room, with an HDMI input of the computer connected to an HDMI input at the presentation location. A VGA adapter may be connected to a VGA input at the presentation location. A camera (e.g., USB camera) is placed on a stand in the middle of the room and aimed at a display in the front of the room. The camera is connected to the computer to verify the camera is capturing the display in the room.

In order to set a local microphone level, a room controller (e.g., near end controller) can communicate with an audio DSP inside a codec through API commands, as connected via an IP or RS-232 connection. The room controller will use the API acknowledgements and commands to determine the measured level the microphone is receiving in the codec. The controller will then communicate with the DSP inside the codec to adjust the microphone gain (up or down) until it hits its target level (e.g., −5 dBU, etc.). At this point, the local microphone is configured for use, and the room controller will apply this setting for a starting point to all other active microphones in the system. A sanity check may be required to validate these results.

After the controller has configured the local microphones, the system may display a message on the codec control interface, telling the operator that the microphones have been configured and the speaker can be turned off. If the room controller is connected to another signal generator via IP, RS-232, etc., the controller can stop the local tone in the room. The controller may then play noise through HDMI output into the codec. The room controller can communicate to the audio DSP inside the codec through API, to adjust the microphone gain (up or down) until it hits its target level of −0 dBU. At this point the local program audio level is configured for use.

In order to configure local video levels, the controller may change a configuration setting or the HDMI output to test for a specific (e.g., predetermined) resolution, such as 720p (60 frames per second), 1080p, etc. This may be performed sequentially at various resolutions across a range, etc. The controller can use API acknowledgements and commands to determine the video signal details (e.g., resolution, framerate, etc.) received at the content input of the codec. The controller may be configured to take a picture and store the picture to verify the resolution recognized on the codec is passed through to the display.

For audio transmission calibration, a near end controller can set up communication with a far end controller. The far end controller communicates with far end equipment. The near end controller then initiates a point-to-point video call to the far end calibrated system and codec. The far end controller communicates with the local DSP to verify speech audio is being received at a calibrated level of −5 dBU. If the level is lower or higher than the target level, the far end controller communicates with the near end controller so the near end controller can adjust an audio transmission (Tx) level of the near end codec DSP. When the level on the far end is verified to be at −5 dBU (e.g., the target level), the system is calibrated for speech transmission from the near end room. At this point, the near end controller can save the codec configuration settings.

A similar process can be used to check calibration of video signals from the near end codec to the far end codec. Specifically, the far end controller verifies the expected video traffic and video signal is being received and displayed at the far end codec.

The far end controller can control the far end codec to transmit a tone of 0 dBU to the near end system. The near end codec DSP can then evaluate the received signal and adjust the receive (Rx) level up and down accordingly (e.g., if the received signal is more or less than 0 dBU).

The near end controller and the far end controller can repeat calibration tests described herein for a variety of different call types. For example, the controllers can perform calibration for a point-to-point video call (e.g., near end to far end and far end to near end), an audio only point-to-point call, a point-to-point video call with audio bridged into the video call, a call to both endpoints through a video MCU, a call to both end points through an audio bridge, a call with a bridged video MCU and audio bridge, etc.

Example embodiments described herein may provide one or more (or none) of the following advantages: improved calibration speed using automatic calibration algorithms, improved accuracy using the automatic calibration algorithms, ability to perform calibrations at locations where a technician is not physically present or cannot be physically present at a desired time, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A videoconferencing calibration system comprising:
a first codec;
a second codec connected to the first codec via a videoconferencing connection;
a first controller in communication with the first codec, the first controller configured to control a videoconferencing component to transmit a videoconferencing signal to the second codec though the videoconferencing connection; and
a second controller in communication with the second codec, the second controller configured to analyze the videoconferencing signal transmitted though the videoconferencing connection to determine a calibration adjustment value according to at least one calibration adjustment rule, and to transmit the determined calibration adjustment value to the first controller, the first controller configured to adjust a signal level setting of the first codec according to the calibration adjustment value transmitted by the second controller.

2. The system of claim 1, further comprising the videoconferencing component, wherein the videoconferencing component includes at least one of a microphone, an audio digital signal processor, an audio line input, a video switcher, and a camera.

3. The system of claim 1, wherein the transmitted videoconferencing signal includes an audio signal.

4. The system of claim 1, wherein the transmitted videoconferencing signal includes a video signal.

5. The system of claim 1, further comprising:
the videoconferencing component; and
a signal generator coupled between the first controller and the videoconferencing component, wherein the first controller is configured to control the signal generator to provide a calibrated signal to the videoconferencing component.

6. The system of claim 1, further comprising:
the videoconferencing component; and
an output component coupled between the first codec and the first controller, the first controller configured to control the videoconferencing component to transmit a local videoconferencing signal to the output component though the first codec, analyze the local videoconferencing signal received at the output component to determine a local calibration adjustment value, and adjust a local level setting of the first codec according to the determined local calibration adjustment value.

7. The system of claim 6, wherein the output component is one of a speaker and a display.

8. The system of claim 1, wherein the first codec comprises one of a room-based component codec, a mobile cart-based codec, a mobile phone-based codec, and a mobile tablet-based codec.

9. The system of claim 1, wherein the first codec is a near end codec located in a first building, the second codec is a far end codec located in a second building separate from the first building, and the videoconferencing connection between the first codec and the second codec includes a network connection between the first codec and the second codec.

10. The system of claim 1, wherein the first controller is configured to save one or more adjusted signal level settings of the first codec and transmit the saved one or more adjusted signal level settings to the second controller.

11. The system of claim 1, further comprising:
the videoconferencing component;
a first computing device; and
a second computing device, wherein the first codec and at least one of the videoconferencing component and the first controller are part of the first computing device, and the second codec and the second controller are part of the second computing device.

12. The system of claim 5, wherein:
the signal generator comprises an audio signal generator;
the videoconferencing component comprises a microphone; and
the system further comprises an audio digital signal processor coupled between the microphone and the first codec.

13. The system of claim 12, wherein:
the signal generator comprises a video signal generator; and
the system further a video switcher coupled between the video signal generator and the first codec.

14. The system of claim 7, wherein the output component comprises the speaker, and the system further comprises:
an audio digital signal processor coupled with the first codec; and
an audio power amplifier coupled between the audio digital signal processor and the speaker.

15. The system of claim 1, wherein the first controller is configured to adjust the signal level setting of the first codec using an API command.

16. A method of calibrating a videoconferencing system, the videoconferencing system comprising a first controller in communication with a first codec, and a second controller in communication with a second codec, the second codec connected to the first codec though a videoconferencing connection, the method comprising:
receiving, at the second codec, a videoconferencing signal transmitted by the first codec to the second codec through the videoconferencing connection between the first codec and the second codec;
analyzing, by the second controller, the videoconferencing signal received at the second codec to determine a calibration adjustment value according to at least one calibration adjustment rule; and
transmitting the determined calibration adjustment value to the first controller to allow the first controller to adjust a signal level setting of the first codec according to the determined calibration adjustment value.

17. The method of claim 16, wherein the received videoconferencing signal is generated by a videoconferencing component in communication with the first codec, the videoconferencing component including at least one of a microphone, an audio digital signal processor, an audio line input, a video switcher, and a camera.

18. The method of claim 17, wherein the received videoconferencing signal is based on a calibrated signal provided to the videoconferencing component by a signal generator in communication with the videoconferencing component.

19. A controller for calibrating a videoconferencing system, the system including a first codec connected to a second codec through a videoconferencing connection, the controller comprising:
an input in communication with the first codec for obtaining a videoconferencing signal received by the first codec from the second codec through the videoconferencing connection; and
an output for transmitting a calibration adjustment value to another controller over a network, the other controller in communication with the second codec;
wherein the controller is configured to analyze the obtained videoconferencing signal received by the first codec to determine the calibration adjustment value according to at least one calibration adjustment rule, and to transmit the determined calibration adjustment value to the other controller to allow the other controller to adjust a signal level setting of the second codec using a level adjustment command of the second codec, the level adjustment command corresponding to the determined calibration adjustment value.

20. The controller of claim 19, further comprising a computing device, the computing device including the first codec and the controller.

21. The controller of claim 19, wherein:
the first codec is a near end codec and the second codec is a far end codec;

the controller and the first codec are located in a first building and the second codec and second controller are located in a second building separate from the first building; and the videoconferencing connection between the near end codec and the far end codec includes a network connection between the near end codec and the far end codec.

* * * * *